United States Patent
Alonzo et al.

(10) Patent No.: US 10,733,324 B2
(45) Date of Patent: *Aug. 4, 2020

(54) PRIVACY ENABLED RUNTIME

(71) Applicant: INTERNATIONAL BUSINESS MACHINES CORPORATION, Armonk, NY (US)

(72) Inventors: Victor G. Alonzo, Wappingers Falls, NY (US); Zachary A. Burns, Poughkeepsie, NY (US); Yuk L. Chan, Rochester, NY (US); Gisela C. Cheng, Poughkeepsie, NY (US); Kin K. Choi, Poughkeepsie, NY (US); Kin Ng, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,856

(22) Filed: Mar. 19, 2019

(65) Prior Publication Data

US 2019/0213358 A1   Jul. 11, 2019

Related U.S. Application Data

(63) Continuation of application No. 15/157,885, filed on May 18, 2016, now Pat. No. 10,255,459.

(51) Int. Cl.
*H04L 29/06* (2006.01)
*G06F 21/62* (2013.01)
(Continued)

(52) U.S. Cl.
CPC ...... *G06F 21/6263* (2013.01); *H04L 63/0407* (2013.01); *H04W 12/02* (2013.01); *H04L 63/0245* (2013.01); *H04W 4/02* (2013.01)

(58) Field of Classification Search
CPC combination set(s) only.
See application file for complete search history.

(56) References Cited

U.S. PATENT DOCUMENTS 6,151,316 A    11/2000   Crayford
6,990,512 B1   1/2006    Major
(Continued)

FOREIGN PATENT DOCUMENTS

JP    2013077269 A    4/2013

OTHER PUBLICATIONS

K. Singh, Practical Context-Aware Permission Control for Hybrid Mobile Applications, In Research in Attacks, ntrusions and Defenses, vol. 8145 of Lecture Notes in Computer Science, Springer Berlin Heidelberg, 2013, pp. 1-20.

(Continued)

*Primary Examiner* — Malcolm Cribbs
(74) *Attorney, Agent, or Firm* — Cantor Colburn LLP; Teddi Maranzano

(57) ABSTRACT

Technical solutions are described for preventing unauthorized transmission of data by a communication apparatus. An example computer-implemented method includes monitoring a data transmission request from an application being executed by the communication apparatus. The data transmission request is associated with transmission data. The method further includes securing the transmission data, where the securing includes identifying a content of a predetermined type in the transmission data, and generating secured transmission data. The secured transmission data includes a corresponding modified version of the content of the predetermined type. The computer-implemented method also includes transmitting the secured transmission data in response to the data transmission request.

20 Claims, 6 Drawing Sheets

(51) Int. Cl.
   *H04W 12/02*   (2009.01)
   *H04W 4/02*    (2018.01)

(56) References Cited

U.S. PATENT DOCUMENTS

| | | |
|---|---|---|
| 8,402,540 B2 | 5/2013 | Kapoor et al. |
| 8,996,688 B2 | 3/2015 | Arrasvuori |
| 10,255,459 B2 | 4/2019 | Alonzo |
| 2002/0161994 A1 | 10/2002 | Cromer |
| 2006/0123238 A1 | 6/2006 | Kacker et al. |
| 2007/0088818 A1 | 4/2007 | Roberts |
| 2008/0075283 A1 | 3/2008 | Takahashi |
| 2008/0172366 A1 | 7/2008 | Hannel et al. |
| 2009/0083544 A1 | 3/2009 | Scholnick |
| 2010/0268938 A1 | 10/2010 | Resch |
| 2010/0268939 A1 | 10/2010 | Resch |
| 2010/0325431 A1 | 12/2010 | Mordetsky |
| 2010/0333165 A1 | 12/2010 | Basak et al. |
| 2011/0145593 A1 | 6/2011 | Auradkar |
| 2011/0258461 A1 | 10/2011 | Bates |
| 2012/0066517 A1 | 3/2012 | Vysogorets |
| 2012/0259877 A1* | 10/2012 | Raghunathan ...... G06F 21/6254 707/757 |
| 2012/0317565 A1 | 12/2012 | Carrara et al. |
| 2012/0331561 A1 | 12/2012 | Broadstone |
| 2013/0174210 A1 | 7/2013 | Park et al. |
| 2013/0212689 A1* | 8/2013 | Ben-Natan ............ H04W 12/02 726/26 |
| 2015/0040180 A1 | 2/2015 | Jacobson et al. |
| 2015/0324593 A1 | 11/2015 | Abuelsaad |
| 2016/0028589 A1 | 1/2016 | Devarajan |
| 2016/0078245 A1 | 3/2016 | Amarendran |
| 2016/0277368 A1 | 9/2016 | Narayanaswamy |
| 2016/0306751 A1 | 10/2016 | Amarendran et al. |
| 2017/0093807 A1 | 3/2017 | Gross et al. |
| 2017/0147829 A1 | 5/2017 | Cismas |
| 2017/0337382 A1 | 11/2017 | Alonzo |
| 2018/0191692 A1 | 7/2018 | Frank |

OTHER PUBLICATIONS

List of IBM Patents or Patent Applications Treated as Related; (Appendix P), Filed May 2, 2019; 2 pages.

Sharma et al., "Different Firewall Techniques: A Survey," IEEE—33044, 5th ICCCNT—2014, Jul. 11-13, 2014, Hefei, China, pp. 1-6.

* cited by examiner

PRIVACY ENABLED RUNTIME

DOMESTIC PRIORITY

This application is a continuation of U.S. patent application Ser. No. 15/157,885, filed May 18, 2016, the disclosure of which is incorporated by reference herein in its entirety.

BACKGROUND

The present application relates to computer technology, and more specifically, to security and/or privacy of data used by applications executing on a computing device.

A number of computer-based services collect data associated with a user via one or more computing devices from which the user accesses the services. For example, the computer-based services may include services such as a searching web-content, accessing maps and directions, accessing consumer reviews, messaging, sharing data (text, images, audio, video and so on) with other users, and many other such services. The data collected when providing such services may include contextual data, such as a location of the user, search queries, items that the user clicked. Such collection of data may raise privacy concerns for the user. In addition, the user may be concerned about the data being transmitted to and/or being collected at repositories that the user did not authorize.

SUMMARY

According to an embodiment, a computer-implemented method for preventing unauthorized transmission of data by a communication apparatus includes monitoring a data transmission request from an application being executed by the communication apparatus. The data transmission request is associated with transmission data. The method further includes securing the transmission data, where the securing includes identifying a content of a predetermined type in the transmission data, and generating secured transmission data. The secured transmission data includes a corresponding modified version of the content of the predetermined type. The computer-implemented method also includes transmitting the secured transmission data in response to the data transmission request.

According to another embodiment, an apparatus for preventing unauthorized transmission of data by a communication apparatus includes a memory, and a processor communicably coupled with the memory. The processor monitors a data transmission request from an application being executed by the communication apparatus, where the data transmission request is associated with transmission data. The processor secures the transmission data, where the securing includes identifying a content of a predetermined type in the transmission data, and generating secured transmission data. The secured transmission data includes a corresponding modified version of the content of the predetermined type. The processor transmits the secured transmission data in response to the data transmission request.

According to another embodiment a computer program product for preventing unauthorized transmission of data by a communication apparatus includes a computer readable storage medium, where the computer readable storage medium includes computer executable instructions. The computer readable storage medium includes instructions to monitor a data transmission request from an application being executed by the communication apparatus, where the data transmission request is associated with transmission data. The computer readable storage medium includes instructions to secure the transmission data, where the securing includes identifying a content of a predetermined type in the transmission data, and generating secured transmission data. The secured transmission data includes a corresponding modified version of the content of the predetermined type. The computer readable storage medium includes instructions to transmit the secured transmission data in response to the data transmission request.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for facilitating a privacy enabled runtime environment for a communication apparatus. For example, the runtime environment according to the technical solutions described, together with programming constructs facilitate a user of the communication apparatus to identify which information is being collected from the communication apparatus. The runtime environment further facilitates the user to filter out specific information that the user may deem as being sensitive or private, at least for a particular operation. The technical solutions may further assist a firewall that operates in conjunction with the communication apparatus to decide whether to transmit or to block outbound data.

The technical solutions thus facilitate the user to identify applications, that is, computer executable software being executed on the communication apparatus, which are collecting information from the communication apparatus. Typically, an application, when being installed, requests access to one or more categories of information from the communication apparatus. For example, the application may request access to contacts, media (images, video, audio), network, incoming/outgoing phone calls, location, and other such categorical information, without specific clarity on the exact information being accessed, collected, or how the information is being used. The user has the choice to deny the request, which results in the user is giving up the benefits of that application, since the application may not install upon denial of the request to the information access.

Figure 1:
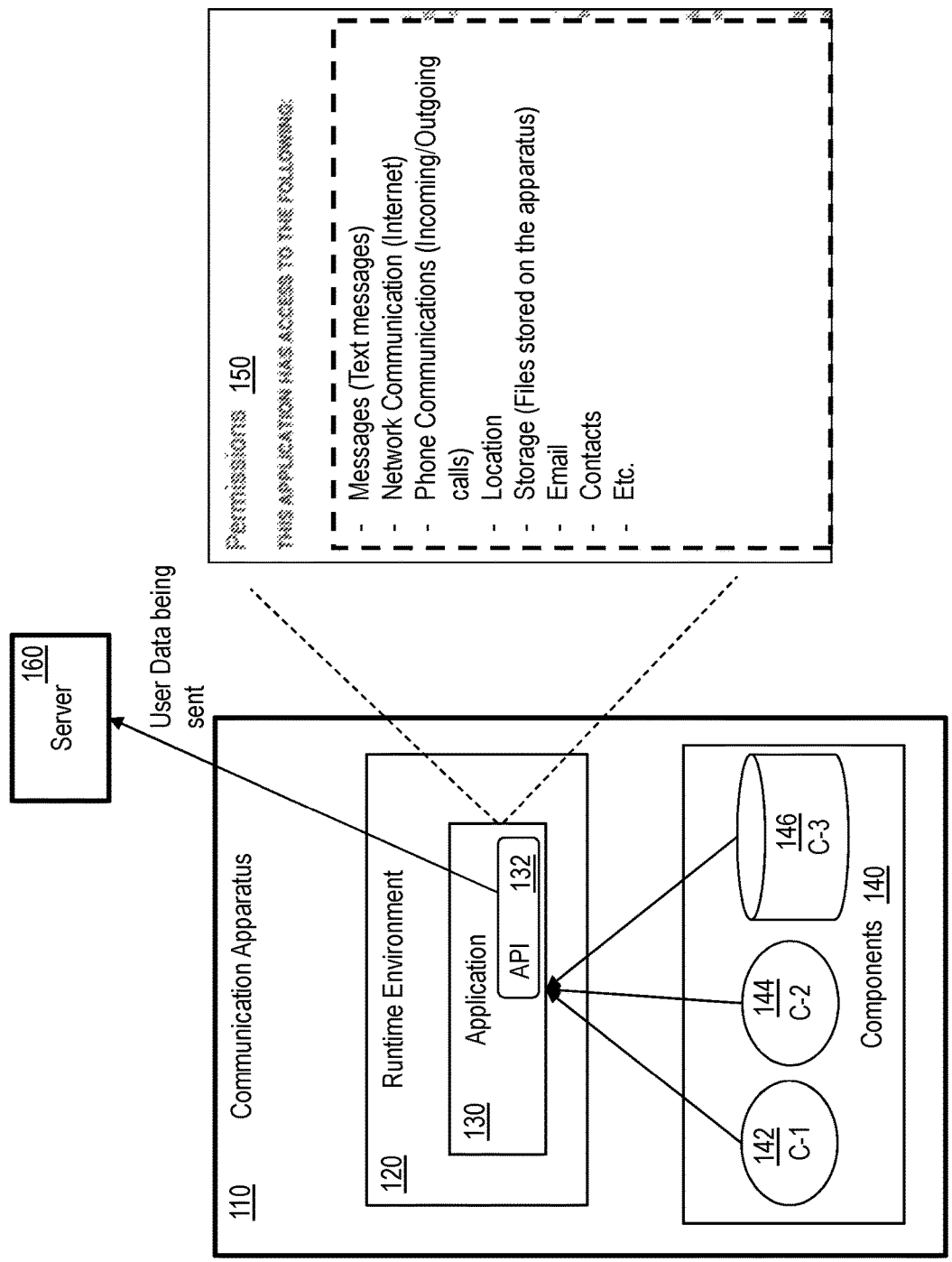
FIG. 1 illustrates an example a communication apparatus for preventing unauthorized transmission of data, in accordance with an embodiment.

FIG. 1 illustrates a communication apparatus 110 that includes a runtime environment 120 and multiple components 140. The communication apparatus 110 may be a phone (such as a smartphone), a wearable device (such as a smartwatch), a tablet computer, a laptop computer, a desktop computer, a server computer, or any other apparatus that can communicate via one or more communication networks.

The runtime environment 120 may be part of an operating system of the communication apparatus 110. The runtime environment 120 facilitates execution of an application 130 by the communication apparatus 110. For example, the runtime environment 120 facilitates the application 130 to send instructions to a processing unit, and access the components 140 and other system resources of the communication apparatus 110. In addition, the runtime environment 120 includes the operating settings (such as environment variables), common libraries, directory structure, network neighbors, and other settings that facilitate the execution of the application 130. Alternatively or in addition, the runtime environment 120 may be a virtual machine. For example, the runtime environment 120 may be an instance of JAVA RUNTIME ENVIRONMENT™ (JRE™) COMMON LANGUAGE RUNTIME™ (CLR™), or any other runtime environment. The runtime environment 120 provides an application programming interface (API) 132 that the application 130 may use to access the system resources of the communication apparatus 110.

For example, the application 130 includes computer executable instructions in a computer programming language that include calls to functions of the API 132. The API 132 facilitates the application 130 to access and use the components 140 of the communication apparatus. A call to a function of the API 132 may be a request to operate on specific data. For example, the call to a function of the API 132 specifies the data in the form of one or more types of parameters and the values of the parameters. For example, the application 130 to transmit data to a server 160, may issue a data transmission request to the runtime environment 120. The data transmission request specifies the transmission data to be sent and an identifier of the destination of the data transmission request. For example, the identifier may be an IP address, a network name, or any other identifier associated with the server 160.

The server 160 may be a remote computer server that collects data from the communication apparatus 110. The server 150 may collect the data in lieu of providing a service to the user of the communication apparatus 110. For example, the server 160 may be an email server that collects the data from the communication apparatus 110 to facilitate the user to send/receive email messages via the communication apparatus 110. Alternatively or in addition, the server 160 may be an instant messaging server, a social media server, a navigation server, a backup server, a search-engine server, a media-streaming server, or any other such server that provides a corresponding service to the user via the communication apparatus 110. Alternatively or in addition, the server 160 may be an advertising server that collects contextual information from the user to provide targeted advertisements to the user.

The contextual data may improve user experience, for example by predicting what the user may want to buy, or obtain help with. In some examples, as described earlier, the application 130 may not be installed without the user agreeing to share data with the server 160 and receive the application's services in exchange. For example, the application 130 may have permissions 150 to access one or more types of data or components 140 of the communication apparatus 110. For example, the permissions 150 may include access to messages (such as text messages), network communication (the Internet), phone communications (incoming/outgoing calls), location (via global position sensor), storage (files stored on the apparatus), email, contacts, camera (images/video), and any other resources of the communication apparatus 110. In an example, the application 130 may have permission to use one or more of the components 140 to generate data and access the data thus generated. The user may give the application 130 the permission 150 explicitly during installation. Alternatively or in addition, in case of malicious applications such as a Trojan horse, a malware, an adware, a virus, or other such notorious application types, the application 130 may gain the permissions 150 unbeknown to the user. Thus, in such cases, the application 130 may share data and information from the communication apparatus, including sensitive and/or private information about the user with the server 160, without the user knowing about such sharing.

For example, the components 140 include hardware and/or software components of the communication apparatus 110. The components 140 may include one or more different types of components C-1 142, C-2 144, C-3 146, among other components. The application 130, using the API 132, may access the components 140 of the communication apparatus and share the data from the components 140 with the server 160. As described herein, the data may be shared with or without the user's authorization. The communication apparatus 110, and/or the runtime environment 120 that implements the technical solutions described herein facilitates the user to control what data is shared by the application 130 with the server 160. Thus, the technical solutions facilitate the user to own and control access to his/her data, and authorize one or more authorized applications to use the data to enhance user experience.

Figure 2:
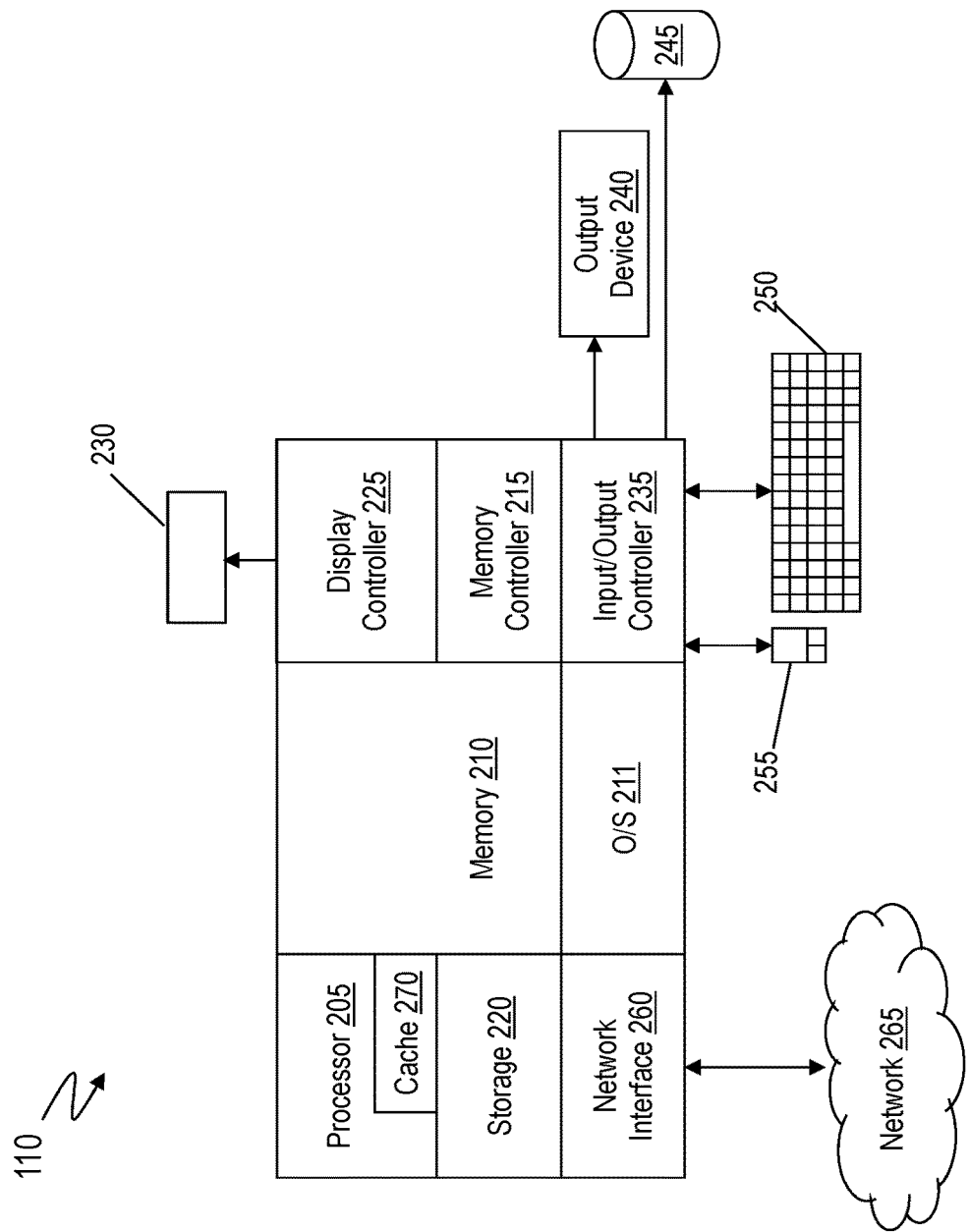
FIG. 2 illustrates example components of a communication apparatus for preventing unauthorized transmission of data, in accordance with an embodiment.

FIG. 2 illustrates example components of the communication apparatus 110. The communication apparatus 110 includes, among other components, a processor 205, memory 210 coupled to a memory controller 215, and one or more peripheral devices 245 and/or output devices 240 that are communicatively coupled via a local I/O controller 235. The peripheral devices 245 may include sensors and devices, for example, battery sensors, touch sensors, gyro meters, position sensors, accelerometers, cameras, depth sensors, indicator/identification lights, and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the communication apparatus 110, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate applications (such as the application 130), each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The communication apparatus 110 may further include a display controller 225 coupled to a user interface or display 230. In some embodiments, the display 230 may be an LCD screen. In other embodiments, the display 230 may include a plurality of LED status lights. In some embodiments, the communication apparatus 110 may further include a network interface 260 for coupling to a network 265. The network 265 may be an IP-based network for communication between the communication apparatus 110 and an external server, client and the like via a broadband connection. In an embodiment, the network 265 may be a satellite network. The network 265 transmits and receives data between the communication apparatus 110 and external systems. In some embodiments, the network 265 may be a managed IP network administered by a service provider. The network 265 may be implemented in a wireless fashion, for example, using wireless protocols and technologies, such as Wi-Fi, WiMAX, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
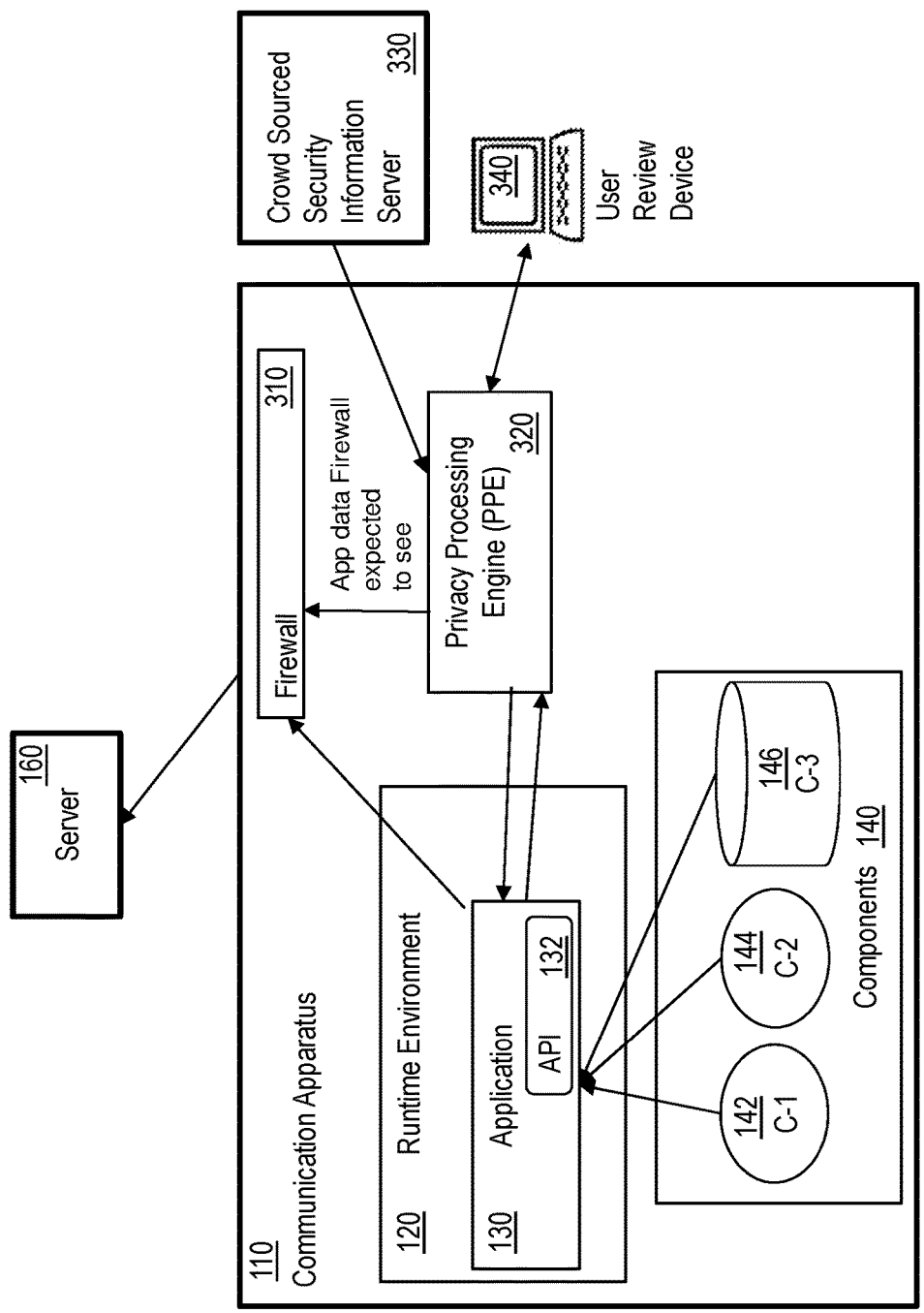
FIG. 3 illustrates an example view of the communication apparatus for preventing unauthorized transmission of data, in accordance with an embodiment.

FIG. 3 illustrates another view of the communication apparatus 110. The runtime environment 120 may work with a firewall 310 and a privacy-processing engine 320 to prevent sensitive data being shared by the application 130 with the server 160. The privacy-processing engine 320 may be part of the runtime environment 120 in an example. The privacy-processing engine 320 may determine whether to block the transmission data, by identifying sensitive content based on predetermined rules. The predetermined rules may be configured by the user. Alternatively or in addition, the privacy-processing engine 320 determines whether to block the transmission data based on a crowd sourced security information server 330.

The crowd sourced security information server 330 may be a server computer or a data repository that contains identifying data that identifies content that may be sensitive. The identifying data is obtained from multiple other communication apparatus. For example, a second communication apparatus, other than the communication apparatus 110, may identify that the application 130 transmits location identifier to the server 160, without authorization to transmit location related content. The second communication apparatus may store, at the crowd sourced security information server 330 that the application 130 transmits data in a specific format or contains specific variables. For example, the crowd sourced security information server 330 may contain information that the transmission data transmits location identifier to the server 160 via a specific parameter in the transmission data. The privacy-processing engine 320, thus blocks the location related content transmitted by the application 130 based on the information accessed from the crowd sourced security information server 330.

Further, once the content to be blocked has been identified, the runtime environment 120 facilitates the user to review and modify the content using the display 230 of the communication apparatus 110. Alternatively, the runtime environment 120 facilitates the user to review and modify the content using a separate user review device 340. The user review device 340 is another communication apparatus, such as a phone, a laptop computer, a desktop computer, a tablet computer, or any other type of communication apparatus. Modifying the transmission data may include removing particular parts of the content or the entirety of the content from the transmission data. Alternatively or in addition, modifying the transmission data may include blanking out particular parts of the content or the entirety of the content from the transmission data. For example, blanking content may include replacing a character of the content to be blanked with a predetermined character The privacy-processing engine 320 may be a module that identifies content in the transmission data that is to be blocked. The privacy-processing engine 320 may include an electronic circuitry or any other hardware device that may be operated according to one or more computer executable instructions. The firewall 310 may be a module that is part of the communication apparatus 110, for example a part of the operating system 211.

Figure 4:
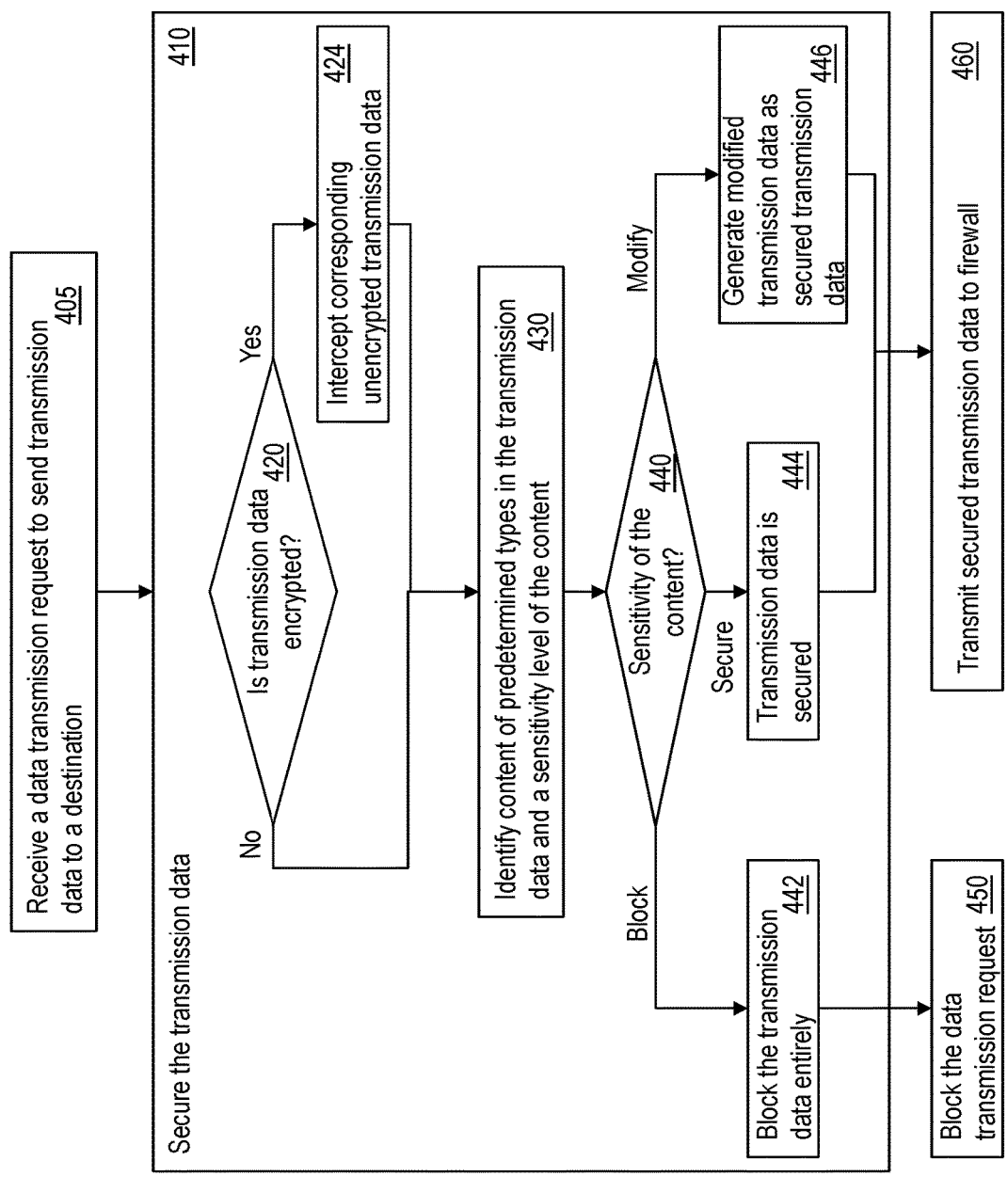
FIG. 4 illustrates a flowchart of example logic for preventing transmission of unauthorized private data to in accordance with an embodiment.

FIG. 4 illustrates a flowchart of an example method for preventing transmission of private data to unauthorized destinations. The runtime environment 120 receives a data transmission request, as shown at block 405. In an example, the runtime environment 120 monitors the function calls via the API 132, and intercepts the data transmission request, for example a function call (for example DataOutputStream( ) in JAVA™) sending transmission data via a communication protocol such as Transmission Communication Protocol (TCP). The data transmission request identifies the transmission data and a destination to which to send the transmission data. The runtime environment 120 secures the transmission data, as shown at block 410.

For example, the runtime environment 120 sends the transmission data to the privacy-processing engine 320 to determine a sensitivity level of the transmission data. If the transmission data in the data transmission request is encrypted, the runtime environment 120 determines the corresponding unencrypted transmission data (that is the original transmission data prior to the encryption), as shown at blocks 420 and 424. For example, the runtime environment 120 identifies an API function call that requested the encryption of the transmission data and captures both the encrypted and unencrypted transmission data. For example, the runtime environment 120 monitors the encryption functions of the API 132 (such as CipherOutputStream( ) in JAVA™) and captures the input data together with the output data for such function calls. Further, in case the communication apparatus 110 is equipped with encryption hardware, such as CRYPTO™ hardware. In an example, the runtime environment 120 monitors and captures the data input to the encryption hardware, together with the output data. Alternatively or in addition, the encryption hardware accepts an input of unencrypted data and generates an output of encrypted data, and makes the unencrypted and the encrypted data available to the privacy-processing engine 320 for analysis. Alternatively, the runtime environment 120 determines the unencrypted transmission data corresponding to the encrypted transmission data associated with the data transmission request. The runtime environment 120 forwards the unencrypted transmission to the privacy-processing engine 320 to determine the sensitivity level of the transmission data. Further, the privacy-processing engine 320, upon determining a sensitivity level of the unencrypted transmission data (as shown at block 440), associates the same sensitivity level with the corresponding encrypted transmission data.

Figure 5:
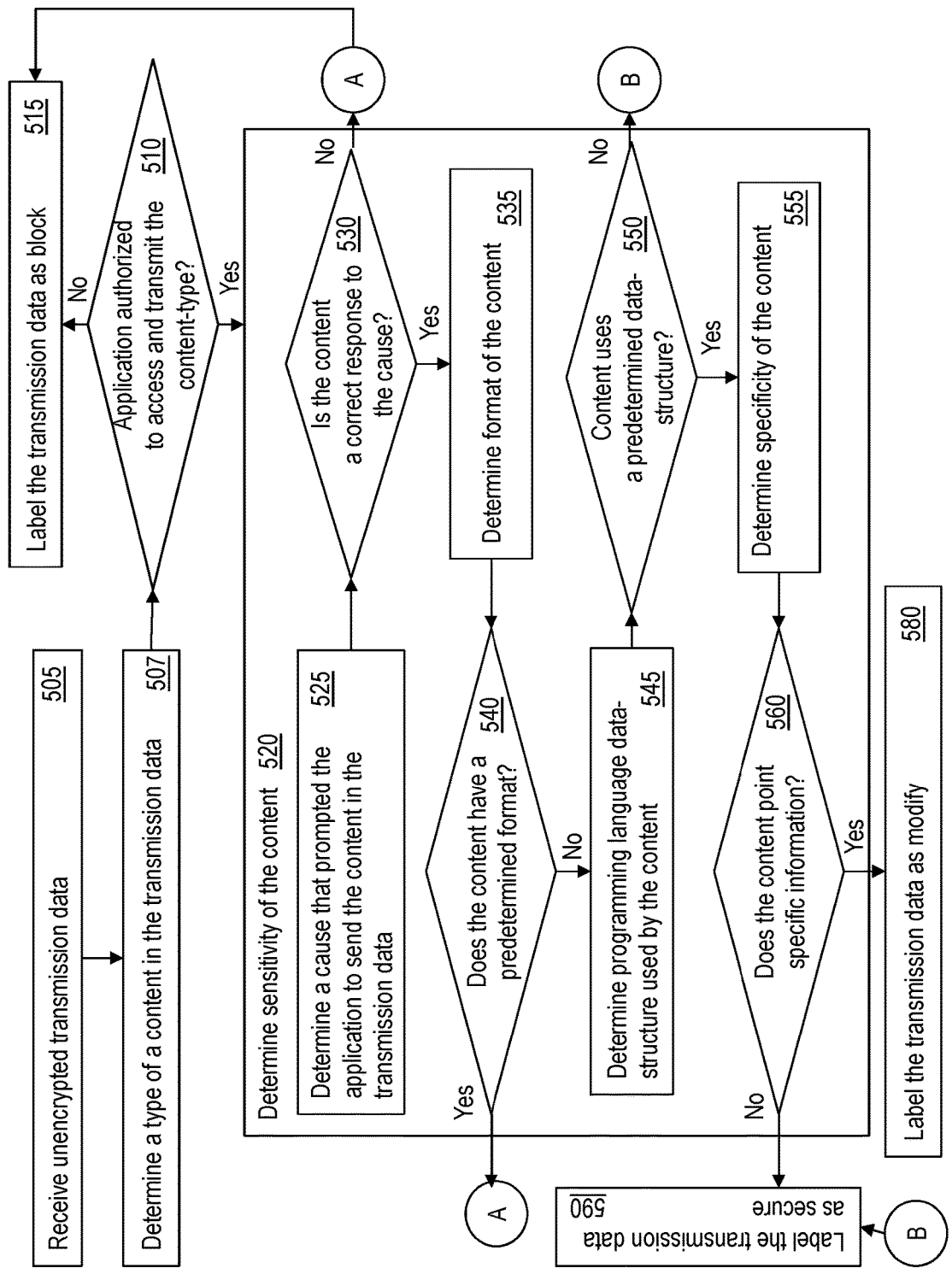
FIG. 5 illustrates a flowchart of example logic to determine sensitivity level of content in transmission data in accordance with an embodiment.

The privacy-processing engine 320 identifies one or more specific contents in the transmission data and the respective sensitivity levels of the contents, as shown at block 430. FIG. 5 illustrates a flowchart of an example method to determine the sensitivity level of content in the transmission data. For example, the privacy-processing engine 320 receives the unencrypted transmission data, as shown at block 505. The privacy-processing engine 320 determines a type of the content in the transmission data, as shown at block 507. For example, the content may be of the type of location information, contacts information, emails, messages, or other such types of content or a combination thereof. The privacy-processing engine 320 may determine if the application is authorized to access and transmit the type of the content identified, as shown at block 510. For example, the user may specify the predetermined types of the content that the application is authorized to access based on the permissions 150. If the application 130 is not authorized to access or transmit the type of the content, the privacy-processing engine 320 labels the transmission data for blocking, as shown at block 515. For example, labeling the transmission data may include associating the transmission data with an identifier corresponding to the label. Alternatively or in addition, labeling the transmission data may include informing the runtime environment 120 of the label associated with the transmission data. For example, the privacy-processing engine 320 sends a response back to the runtime environment 120, using the API 132 with the label (for example a PrivacyState). The label may indicate one of three states, send unchanged, modify and send, and blocked. Of course, additional or fewer states may be used in other examples.

Referring to FIG. 5, if the privacy-processing engine 320 determines that the application 130 is authorized to access and transmit the content-type, the privacy-processing engine 320 determines the sensitivity of the content, as shown at blocks 510 and 520. For example, the privacy-processing engine 320 determines a cause that prompted the application 130 to send the content in the transmission data, as shown at block 525. For example, the privacy-processing engine 320 uses recent incoming data for the application 130 to assist analysis of determining whether the application 130 is responding to a request with the identified content in the transmission data. Accordingly, the privacy-processing engine 320 analyzes the incoming data and the transmission data for meaning and context of the content. If the privacy-processing engine 320 determines that the content is being transmitted in response to a request for the type of the content, the privacy-processing engine 320 deems that the content is a correct response to the cause of the transmission, as shown at block 530. If the content is not the correct response, the privacy-processing engine 320 labels the transmission data for blocking, as shown at blocks 530 and 515. Alternatively, if the content is the correct response, the privacy-processing engine 320 further analyzes the content to determine if the transmission data is secure or is to be modified, as shown at block 530.

For example, the privacy-processing engine 320 determines a format of the content, as shown at block 535. For example, the privacy-processing engine 320 may check if the content uses a specific format, for example, "9.12.3.10" is likely an IP Address, abc@gmail.com is likely an email address, 123-456-785 is likely a phone number, 123-45-6789 is likely a social security number, and so on. The user may specify a set of predetermined formats of data that are to be filtered from transmission. Alternatively or in addition, the privacy-processing engine 320 accesses the predetermined formats to be filtered from the crowd sourced security information server 330. Alternatively or in addition, the privacy-processing engine 320 may be preconfigured with predetermined formats to filter. If the content in the transmission data matches a predetermined format from the set of predetermined content formats to be filtered, the privacy-processing engine 320 labels the transmission data for blocking, as shown at blocks 540 and 515. Alternatively, if the content is not of the predetermined formats, the privacy-processing engine 320 further analyzes the content to determine if the transmission data is secure or is to be modified, as shown at block 540.

For example, the privacy-processing engine 320 determines a programming language data-structure used by the content, as shown at block 545. For example, the privacy-processing engine 320 determines a type of the variable used by the content in the function call of the data transmission request. For example, the data-structure may be determined based on metadata (for example JAVA™ annotation) of the variable used to specify the content. In another example, the privacy-processing engine 320, via the API 132 requests the runtime environment 120 for a description of the data-structure being used by the content. For example, the runtime environment 120 provides a complimentary API function to facilitate the privacy-processing engine 320 to determine the data-structure. An example of such a complimentary API function is provided in table 1. The privacy-processing engine 320 may further obtain the data-structure information from documentation of the application 130 and/or the documentation of the API function call (for example, JAVADOC™, MICROSOFT DEVELOPER NETWORK™) being used for the data transmission request.

TABLE 1

Complimentary Method Example

Original Method: Date getDate( )
Added Method in Runtime Environment: String getDate_description( )

The privacy-processing engine 320 further analyzes the identified data-structure to determine if the application 130 is transmitting grouped content. For example, the data-structure may combine GPS and Time data, which can be used to track the user's schedule, while the GPS data alone can only track the user's location. For example, the data-structure may be a JSON object, or any other such grouped data-structures that facilitate the application 130 to transmit multiple content-types as a combined package. The privacy-processing engine 320, by determining the data-structure, facilitates filtering such grouped outgoing data. If the data-structure of the content is not one of predetermined data-structures, the privacy-processing engine 320 labels the transmission data as secure, which indicates sending the transmission data without any changes, as shown at blocks 550 and 590. Alternatively, if the content is not of the predetermined data-structures, the privacy-processing engine 320 further analyzes the content to determine if the transmission data is secure or is to be modified, as shown at block 550.

For example, the privacy-processing engine 320 determines a specificity of the content, as shown at block 555. For example, the privacy-processing engine 320 compares the content with company-specific codenames, or other keywords in a company policy. The company-specific codenames may be associated with specific secrets, such as trade secrets, new products, marketing campaigns, or other information that a company, such as a business, prefers to be secret and not being disclosed outside the company. For example, the privacy-processing engine 320 may determine that the content contains a codename "ABCXYZ," which is a new hardware that company ACME is working on. Alternatively or in addition, the privacy-processing engine 320 may determine that the content includes specific location or personal information, such as "south town mall," which may be a location, or "Patrick," which is likely a name. If the content provides specific information, the privacy-processing engine 320 labels the transmission data for modification, as shown at blocks 560 and 580. Else, the privacy-processing engine 320 labels the transmission data as secure, as shown at block 590.

It is understood that the flowchart of FIG. 5 provides one example of labeling the transmission data, and that other examples may label the transmission data in manners different than that in FIG. 5. For example, in cases where the flowchart of FIG. 3 labels the transmission data for blocking, other examples may label for modification. Further, in other examples, determining the sensitivity may use additional, fewer, or different checks than those illustrated in FIG. 5. For example, in another example, specificity of the content may not be checked. Or in yet another example, the format of the content may not be checked, and so on.

Referring back to FIG. 4, once the sensitivity labels of the transmission data are assigned, the privacy-processing engine 320 notifies the runtime environment 120 of the label. If the label indicates secure, the runtime environment 120 sends the transmission data to the firewall 310 for further processing, as shown at blocks 440, and 444. Further, if the label indicates that the transmission data is to be modified, the runtime environment 120 generates modified transmission data as secured transmission data, as shown at blocks 440, and 446. The runtime environment 120 may forward the secured transmission data, which includes the modified transmission data to the firewall for further transmission, as shown at block 460.

For example, the firewall 310 verifies whether the transmission data meets the preconfigured criteria of the firewall. If not, the firewall 310 may handle the transmission data as potentially dangerous, using preconfigured firewall rules. Else, if the transmission data meets the preconfigured criteria, the firewall 310 forwards the transmission data to the server 160.

Alternatively, if the label indicates that the transmission data is to be blocked, the runtime environment 120 may not transmit the data to the firewall 310, as shown at blocks 440, 442, and 450. The runtime environment 120 may raise an error and prevent the application 130 from transmitting the transmission data. Alternatively or in addition, the runtime environment 120 prompts the user to review the data transmission request and select whether to continue with the data transmission or to continue blocking the data transmission.

Figure 6:
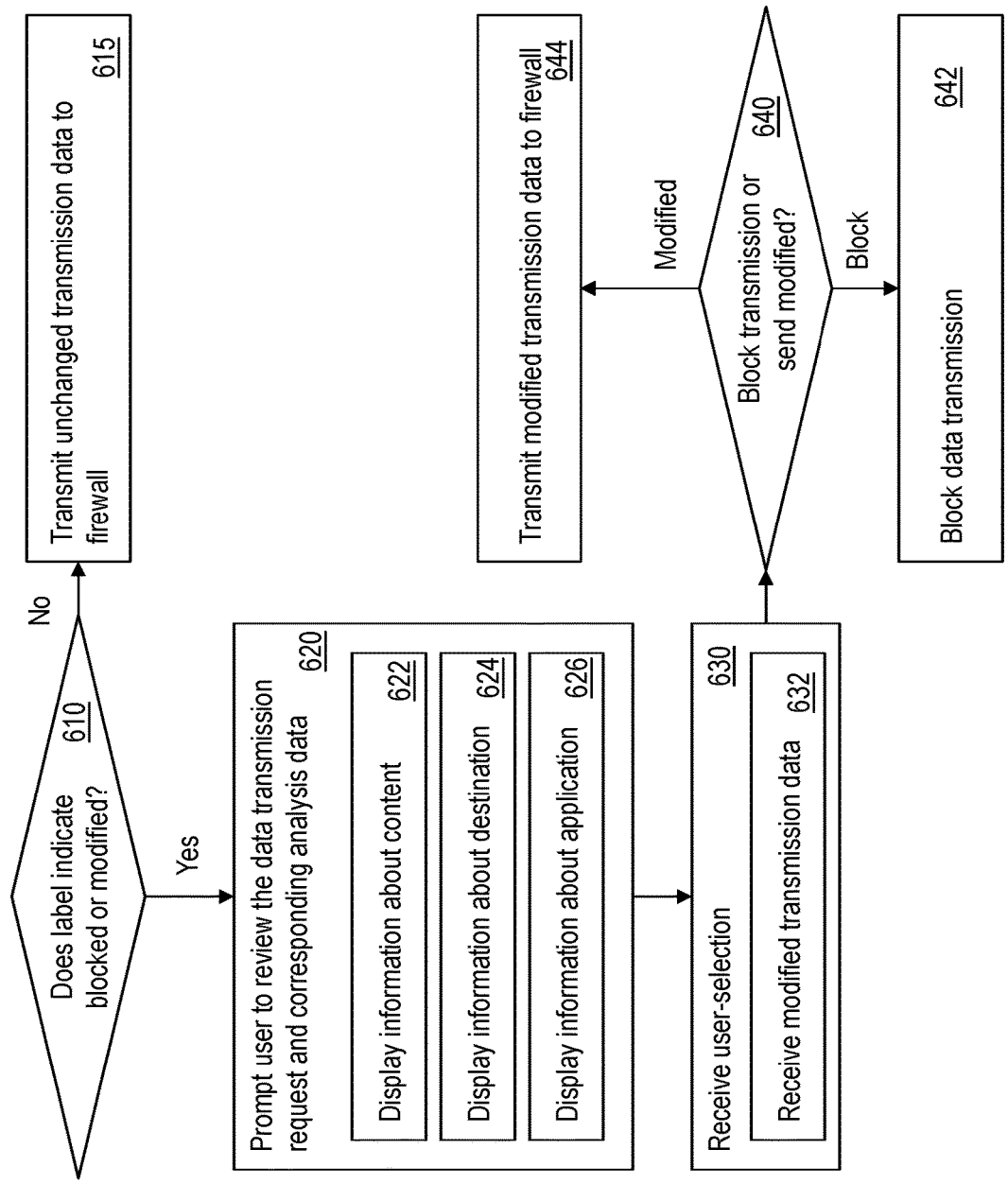
FIG. 6 illustrates a flowchart of example logic to facilitate user review of transmission data requests that are labeled for blocking or modifying in accordance with an embodiment.

FIG. 6 illustrates a flowchart of an example method to facilitate user review of transmission data requests that are labeled for blocking or modifying. For example, if the label from the privacy-processing engine indicates that the transmission data is to be blocked or modified, the runtime environment 120 prompts the user to review the data transmission request and corresponding analysis data, as shown at blocks 610, and 620. Else, if the label indicates sending the data unchanged, the runtime environment 120 forwards the transmission data to the firewall 310, as shown at block 615, and as described herein.

For example, the runtime environment 120 may display an interactive prompt to the user. The runtime environment 120 may display the interactive prompt via the communication apparatus 110 or via the user review device 340. The interactive prompt may display information about content, as shown at block 622. For example, the runtime environment 120 may display crowd sourced preference associated with the content. For example, the crowd sourced preference may include a proportion (such as a percentage) of other users that reject (or accept) the sharing of such content, and/or a summary of the crowd-sourced rationale of such rejection (or acceptance).

In addition or alternatively, the interactive prompt may display information about the destination of the data transmission request, for example the server 160, as shown at block 624. For example, the runtime environment 120 may display information associated with the server 160 retrieved from the crowd-sourced security information server 330. The information may be retrieved based on an identifier of the server 160, such as an IP address. For example, the information may indicate a proportion of the other users that reject (or accept) sharing information with the server 160. For example, the server 160 may be an advertising server, and hence the other users may have opted not to share the information with the server 160. Thus, the technical solutions facilitate blocking transmission data from being sent to a specific advertising server.

In addition or alternatively, the interactive prompt may display information about the application 130 that initiated the data transmission request, as shown at block 626. For example, the runtime environment 120 may display information associated with the server 160 retrieved from the crowd-sourced security information server 330. The information may be retrieved based on an identifier of the application, such as a name of the application, an identity of the developer of the application, and other such information associated with the application 130. For example, the information may indicate a proportion of the other users that reject (or accept) sharing information by the application 130.

Further, based on whether the user-selection indicates to block or transmit a modified version of the transmission data, the runtime environment 120 either blocks the data transmission request or transmits the modified transmission data to the firewall 310, as shown at blocks 640, 642, and 644. Alternatively, the firewall 310 generates the modified transmission data based on a request from the runtime environment 120. Alternatively or in addition, the firewall 310 generates the modified transmission data based on information from the privacy-processing engine 320, such as by receiving the modifications to be made to the transmission data from the privacy processing engine 320.

Thus, the runtime environment 120, via the interactive prompt, facilitates the user to review the outbound transmission data. Together with the analysis results, recommendations from other users, and other metadata associated with the data transmission request, the user can review and select the behavior of the data transmission request, and thus the application 130. For example, if the crowd sourced statistics indicated that 50% (or more) of the other users replace a User ID being sent by the application 130 to the server 160 with a one-time generated ID, the privacy-processing engine 320 automatically provides such a replacement as a recommendation to the user via the interactive prompt.

In addition, the runtime service may keep a log of all outbound data transmissions and facilitate the user to review the outbound data transmissions periodically (for example, every 24 hours, weekly, or any other frequency), and modify future behavior of the outbound data transmissions.

In response to the interactive prompt, the user can select to review a subset of the presented data, or a combination of the data. The interactive prompt may further include hyperlinks or other elements to facilitate the user to select whether to block or modify the transmission data.

The runtime environment 120 receives a user-selection whether to block the transmission data or to modify the transmission data, as shown at block 630. For example, in case the user-selection indicates that the transmission data is to be modified, the runtime environment 120 further receives modified transmission data, as shown at block 632. The user may manually provide modified transmission data. Alternatively or in addition, the runtime environment 120 automatically generates the modified transmission data. For example, content such as identifiers (like social security numbers, phone numbers, etc.) in the transmission data may be modified by assigning a generated trackable unique identifier, such as an identifier generated using a universally unique identifier (UUID) generation algorithm. Alternatively or in addition, if the content points to specific information, the transmission data may be modified so that the modified transmission data includes generalized information. For example, if the content was "Acme Supermarket," the modified content may be "Acme Plaza," or a name of the neighborhood, or city, of "Acme Supermarket." Thus, the runtime environment 120 facilitates replacing a first location identifier in the transmission data with a second location identifier. The second location identifier may be a geographic area or neighborhood that includes the location identified by the first location identifier. Accordingly, the runtime environment 120 facilitates providing generic information in place of specific information.

In another example, if the content included a specific time such as 10:20 AM, the modified content may specify a range, such as 10:00 AM-10:30 AM, which includes the specific time. In another example, the transmission data may include a system snapshot, such as a First Failure Data Capture (FFDC), which may include attributes of the communication apparatus 110. Such transmission data may be modified to eliminate particular information that may be characteristic to how the communication apparatus is used within a specific network, such as an internal network of the business or company to which the user belongs.

In an example, the runtime environment 120 indicates to the application 130 that specific content in the transmission data has been modified. The runtime environment 120 may identify the fields of the transmission data that include the content that is tampered. The application 130 may determine whether to continue with the data transmission request using the modified transmission data, or not to send the data altogether. Or, the Server can decide to use a modified data, use the modified data differently, use the modified data based on the modification mechanism (for example, Store modified to City) or not to use the modified data.

Thus, the technical solutions described herein facilitates monitoring outgoing information from an application at the runtime environment level (such as a JVM™, PYTHON™ INTERPRETER, C RUNTIME LIBRARY™), perform filtering using a combination of user policy, analytics, and crowd sourcing. In exemplary implementations described herein, the runtime environment of a communication apparatus detects and modifies sensitive outbound sensitive information, even before the outbound data reaches a firewall. In addition to information filtering at the runtime environment level, the technical solutions further facilitate the transmission data to be blocked at the firewall, by inspecting the content of the outbound data. In addition, the technical solutions facilitate dynamically modifying the outbound data prior to transmission, and sending modified data in place of the outbound data.

Thus, the technical solutions described herein facilitate protecting data, such as personal, sensitive, or private data based on content/context of the outbound data. In an example, the runtime environment initiates modification of the transmission data upon detecting that the transmission data is being transmitted. In other words, the runtime environment enables the application to retrieve and use any data on the communication apparatus, which may be used to provide service(s) to the user, until the application initiates a transmission of data. Thus, only when the application tries to share data, such as with a server, the runtime environment initiates the detection and modification of sensitive information in the data that the application schedules for transmission.

Although the description describes the technical solutions being implemented as part of the runtime environment, it will be understood that the technical solutions may be implemented in various other manner such as a programming language, or as part of an existing runtime environment, communication apparatus, and so on.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third, action later initiates the second action whenever the flag is set.

To clarify the use of and to hereby provide notice to the public, the phrases "at least one of <A>, <B>, . . . and <N>" or "at least one of <A>, <B>, <N>, or combinations thereof"

or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, or N including any one element alone or the one element in combination with one or more of the other elements, which may also include, in combination, additional elements, not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device, accessible, or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer-implemented method for preventing unauthorized transmission of data by a communication apparatus, the method comprising:
    monitoring a data transmission request from an application being executed by the communication apparatus, wherein the data transmission request is associated with transmission data;
    securing the transmission data, wherein the securing comprises:
        identifying a first unencrypted content of a predetermined type in the transmission data;
        determining a cause of the first unencrypted content to be included in the transmission data by analyzing an incoming data to which the transmission data is being sent as a response;
        based on the determination that the first unencrypted content is not a requested response to the incoming data, blocking the transmission data;
        based on the determination that the first unencrypted content is a requested response to the incoming data, securing the transmission data, the securing comprising:
            modifying the transmission data by replacing the first unencrypted content of the predetermined type with a second unencrypted content in the transmission data; and
            generating a secured transmission data by encrypting the modified transmission data comprising the second unencrypted content, wherein the secured transmission data includes encrypted content corresponding to the second unencrypted content; and
    transmitting the secured transmission data in response to the data transmission request.

2. The computer-implemented method of claim 1, wherein the transmission data is secured in response to the data transmission request from the application being in response to a request from a predetermined source.

3. The computer-implemented method of claim 1, wherein the predetermined type of the content is an identifier and the second unencrypted content includes a dynamically generated trackable identifier.

4. The computer-implemented method of claim 1, wherein the predetermined type of the content is a first location identifier, and the second unencrypted content is a second location identifier.

5. The computer-implemented method of claim 4, wherein the second location identifier identifies a geographic area that includes a location that the first location identifier identifies.

6. The computer-implemented method of claim 1, wherein the predetermined type of the content identifies a time, and the second unencrypted content is a time-range that includes said time.

7. The computer-implemented method of claim 1, wherein the predetermined type of the content identifies a predetermined group of contextual data.

8. The computer-implemented method of claim 1, wherein the predetermined type of the content is identified based on a type of programming language constructs used in the data transmission request.

9. The computer-implemented method of claim 1, wherein securing the transmission data further comprises:
    displaying a prompt that identifies the content of the predetermined type and a destination of the data transmission request;
    receiving a selection indicative of whether to modify the transmission data; and
    modifying the transmission data in response to the selection indicating to modify the transmission data, and continuing to use said transmission data in response to the selection indicating not to modify the transmission data.

10. The computer-implemented method of claim 9, further comprising receiving a modified version of the content to use for the generating of the secured transmission data.

11. An apparatus for preventing unauthorized transmission of data by a communication apparatus, the apparatus comprising:
    a memory; and
    a processor communicably coupled with the memory, the processor configured to:
        monitor a data transmission request from an application being executed by the communication apparatus, wherein the data transmission request is associated with transmission data;
        secure the transmission data, wherein the securing comprises:
            identifying a first unencrypted content of a predetermined type in the transmission data;
            determining a cause of the first unencrypted content to be included in the transmission data by analyzing an incoming data to which the transmission data is being sent as a response;

based on the determination that the first unencrypted content is not a requested response to the incoming data, blocking the transmission data;

based on the determination that the first unencrypted content is a requested response to the incoming data, securing the transmission data, the securing comprising:

modifying the transmission data by replacing the first unencrypted content of the predetermined type with a second unencrypted content in the transmission data; and generating a secured transmission data by encrypting the modified transmission data comprising the second unencrypted content, wherein the secured transmission data includes encrypted content corresponding to the second unencrypted content; and transmit the secured transmission data in response to the data transmission request.

12. The apparatus of claim 11, wherein the transmission data is secured in response to the data transmission request from the application being in response to a request from a predetermined source.

13. The apparatus of claim 11, wherein the predetermined type of the content is a first location identifier, and the second unencrypted content is a second location identifier.

14. The apparatus of claim 13, wherein the second location identifier identifies a geographic area that includes a location that the first location identifier identifies.

15. The apparatus of claim 11, wherein the predetermined type of the content identifies a time, and the corresponding modified version of the content is a time-range that includes said time.

16. The apparatus of claim 11, wherein the predetermined type of the content is identified based on a type of programming language constructs used in the data transmission request.

17. A computer program product for preventing unauthorized transmission of data by a communication apparatus, the computer program product comprising a computer readable storage medium, the computer readable storage medium comprising computer executable instructions, wherein the computer readable storage medium comprises instructions to:

monitor a data transmission request from an application being executed by the communication apparatus, wherein the data transmission request is associated with transmission data;

secure the transmission data, wherein the securing comprises:

identifying a first unencrypted content of a predetermined type in the transmission data;

determining a cause of the first unencrypted content to be included in the transmission data by analyzing an incoming data to which the transmission data is being sent as a response;

based on the determination that the first unencrypted content is not a requested response to the incoming data, blocking the transmission data;

based on the determination that the first unencrypted content is a requested response to the incoming data, securing the transmission data, the securing comprising:

modifying the transmission data by replacing the first unencrypted content of the predetermined type with a second unencrypted content in the transmission data; and generating a secured transmission data by encrypting the modified transmission data comprising the second unencrypted content, wherein the secured transmission data includes encrypted content corresponding to the second unencrypted content; and transmit the secured transmission data in response to the data transmission request.

18. The computer program product of claim 17, wherein securing the transmission data further comprises:

displaying a prompt that identifies the content of the predetermined type and a destination of the data transmission request;

receiving a selection indicative of whether to modify the transmission data; and modifying the transmission data in response to the selection indicating to modify the transmission data, and continuing to use said transmission data in response to the selection indicating not to modify the transmission data.

19. The computer program product of claim 17, wherein the computer readable storage medium comprises instructions to send the secured transmission data to a firewall.

20. The computer program product of claim 17, wherein the first unencrypted content is determined to be unsecure based on the first unencrypted content using a predetermined type of data-structure.

* * * * *